Patented Mar. 4, 1941

2,233,442

UNITED STATES PATENT OFFICE 2,233,442

POLYMERIC VINYLIDENE CHLORIDE ARTICLE

Ralph M. Wiley, Midland, Mich., assignor to The Dow Chemical Company, Midland, Mich., a corporation of Michigan No Drawing. Application May 31, 1938, Serial No. 211,055

4 Claims. (Cl. 28—1)

The present invention relates particularly to films and filaments fabricated from polymeric vinylidene chloride and certain co-polymers thereof, which articles are characterized by having orientation of the polymer molecules parallel to one another and to the major surface of the articles.

Such films, filaments, and the like, which are herein referred to as articles capable of lying substantially in a single plane, can be fabricated from the polymer of pure vinylidene chloride, or co-polymers thereof with other polymerizable materials wherein the proportion of vinylidene chloride is above about 80 per cent and preferably above about 85 per cent by weight. These polymeric bodies, when subjected to treatment of the type more fully described hereinafter in order to form them into films and the like, exhibit a characteristic crystalline X-ray diffraction pattern in which the polymer molecules are orientated parallel to one another and to the major surface of the fabricated article. Articles so characterized have a very high degree of flexibility and an ultimate tensile strength far exceeding films and filaments formed from the usual polymeric bodies.

Most of the materials co-polymerizable with vinylidene chloride do not in themselves exhibit characteristeric X-ray patterns and many of the co-polymers of vinylidene chloride containing large proportions of these materials are similarly incapable of being drawn into strong, pliable articles. There is, then, an upper limit of the amount of material co-polymerized with the vinylidene chloride for the purposes of the present invention. In the case of most co-polymers of vinylidene chloride, there should be less than 20, and usually less than 15 per cent of the other polymerizable component. The practical upper limit of 15 per cent of co-polymerizable material applies to co-polymers of vinylidene chloride with vinyl chloride, vinyl acetate, styrene, ethyl acrylate, methyl acrylate, methyl methacrylate, and many other co-polymerizable compounds.

The polymers of pure vinylidene chloride and co-polymers of this material with such proper concentration of other polymerizable material as will produce crystalline polymers may be formed into filaments, threads, and the like by any of several common methods. Among the practical methods for doing this is the process which comprises extruding the hot molten polymer and drawing the extruded polymer down to the desired dimension, or merely drawing filaments continuously from a molten mass of the polymer. Another method comprises spinning filaments or threads from solvents and evaporating or extracting the solvent from the so-fabricated article. In view of the relative insolubility of the vinylidene chloride polymer in most common solvents at ordinary temperatures, this latter method also requires elevated temperatures and is not believed to offer any material advantages over those accruing to the extrusion or drawing methods previously mentioned. When extruding or drawing filaments, films, or sheets from a molten mass of a vinylidene chloride polymer, temperatures in the range from 140 to about 240° C. must be employed depending on the softening point of the particular polymer employed and the type of plasticizer or heat stabilizing agent which may have been incorporated therein. In all of the methods which I have thus far employed in the preparation of the new tough, pliable products constituting the present invention, the polymer, at some stage in the process, is heated to a temperature of at least 15 to 25 centigrade degrees above its softening point and subsequently cooled, preferably rapidly, to convert it to the "supercooled" stage from which it can be cold-drawn to tough, pliable articles which, on examination by X-ray diffraction methods, show molecular orientation along the fiber axis, in the case of filaments and the like, or orientation parallel to the surface of films and similar sheet-like material.

The preferred method comprises heating the polymer or co-polymer to a temperature substantially above the softening point thereof, but preferably below the decomposition temperature of such resinous materials, for such a period of time that the material becomes very plastic, and then chilling the product rapidly, e. g. within 2 to 60 seconds, to a temperature below the softening point and suitably in the range from about 100° C. down to about room temperature, whereby a supercooled form of the polymer or copolymer is obtained. Such supercooled polymeric body retains an excellent degree of plasticity for from 2 to 60 minutes or longer depending on the nature of the polymer therein, and during this period can be cold-worked readily. The polymers falling within the composition range previously defined which have been subjected to the above described treatment and to plastic deformation, while in the supercooled state, have all been found to exhibit the characteristic X-ray pattern which indicates molecular orientation along the fiber axis. The fibers and similar articles produced according to this invention may be woven into highly insoluble and chemical resistant cloth for use as filter cloths in handling chemicals and the like as well as for the more common uses of textiles. These filaments may similarly be woven into fish nets which are highly resistant to attack by fresh or salt water and to the organisms occurring therein. Such materials have far greater tensile strength than have the customary cotton and hemp nets. Textile materials made from the herein described fibers, filaments or threads are superior to silk, cotton, linen, wool, rayon or synthetic condensation polymers from the standpoint of their resistance to water, chemicals, solvents or combination thereof. They are also lighter in weight and considerably tougher and more flexible than the recently developed glass fabrics.

The following examples illustrate various means of producing articles falling under the present invention:—

Example 1

Pure vinylidene chloride (boiling point 31.5–32° C.) was polymerized at 50° C. in the presence of 0.5 per cent of benzoyl peroxide as a catalyst. Polymerization was continued until about 20 per cent of the monomer had been polymerized. The resulting vinylidene chloride polymer was washed with acetone to remove remaining monomer therefrom and dried. It was heated to 230° C., at which temperature the entire mass was molten, and was then cooled rapidly to about room temperature and formed into tough, pliable fibers by stretching the supercooled product rapidly until the diameter of the filament produced was about 0.001 inch. The so-formed fibers had tensile strengths varying in the range from 15,000 to 35,000 lbs./sq. in. These fibers were unaffected in their strength, toughness, weight, and general appearance after samples thereof had been immersed for one month in each of the following liquids at room temperature: sulphuric acid, concentrated nitric acid, hydrofluoric acid, 50 per cent sodium hydroxide solution, acetone, water, alcohol, carbon tetrachloride, naphtha, and benzene. The fibers were spun or woven into a variety of textile articles which, on account of the high softening point (about 190° C.) and the general resistance to attack by chemicals, could be employed for a variety of purposes. X-ray examinations of the fibers showed that they had molecular orientation parallel to the fiber axis.

Example 2

A co-polymer of vinylidene chloride and vinyl chloride containing about 7 per cent of the latter was prepared by polymerizing a mixture of the monomers at 40° C. in the presence of one per cent by weight of benzoyl peroxide as a catalyst. The polymer was washed with acetone and dried and was plasticized by intimately mixing therewith 5 per cent by weight of tricresyl phosphate. The plasticized co-polymer was heated to about 180° C. and extruded through an orifice having a diameter of approximately 0.067 inch. The extruded filament was passed directly into a water bath maintained at 25° C. from which it was removed while still in the supercooled state and stretched to a diameter of 0.040 inch at room temperature. The resulting fiber exhibited a characteristic X-ray diagram indicating orientation along the fiber axis, and had a tensile strength of 18,000 lbs./sq. in. This fiber had a softening point in the range from 150° to 160° C. and was as resistant to attack by aqueous acids, alkalies, and common solvents at ordinary temperature as was the product described in Example 1. This fiber was very tough and pliable and could be tied into hard knots. Fish nets and filter cloths were manufactured from filaments prepared as described above and found to be very satisfactory for their respective purposes.

Example 3

A co-polymer of vinylidene chloride and about 7 per cent of vinyl acetate by weight was prepared by polymerizing a mixture of the monomeric materials at 30° C. in the presence of 0.5 per cent each of benzoyl peroxide, tetraethyl lead and phosgene and 0.01 per cent of copper stearate as catalysts. The product was washed with hot acetone containing 5 per cent of nitric acid and finally with acid-free acetone and dried at 60° C. It was then heated to 100° C. in the presence of an equal weight of dioxane which acted as a swelling agent and dispersion medium for the co-polymer at this temperature. The so-formed gelatinous mass was extruded at 85° C. through an orifice of approximately 0.008 inch diameter. The extruded fiber was freed from dioxane in a current of air at 95° C. and then heated to 180° C. by immersion in hot glycerine and finally allowed to cool to room temperature. Upon cold-drawing of this filament a fiber was produced having a diameter of about 0.002 inch, the tensile strength of which was 27,000 lbs./sq. in. The so-formed fiber was extremely tough and in its general physical characteristics, i. e. appearance, flexibility, and "feel," resembled natural silk of similar diameter. It softened without decomposition at about 160° C. and was resistant to attack by water, acids, alkalies, and common dry cleaning solvents such as acetone, alcohol, benzene, chloroform, naphtha, and the like, when tested in a manner analogous to that described in Example 1. This product exhibited a clear X-ray fiber diagram showing orientation of the molecules along the fiber axis.

Example 4

A co-polymer comprising 92 per cent of vinylidene chloride and 8 per cent styrene, and which on X-ray examination was found to be crystalline in nature but without molecular orientation, was softened in a glycerine bath at 200° C. and subjected to rapid drawing and simultaneously cooled in air. This process produced tough filaments wherein the molecules were oriented parallel to the fiber axis and which had a tensile strength of about 22,000 lbs./sq. in. and a softening point above 180° C. This product was substantially as flexible as any of those previously described and could be employed for similar purposes.

By way of contrast a co-polymer of 75 per cent vinylidene chloride and 25 per cent styrene, when subjected to similar treatment, was found to be non-crystalline and could not be drawn to tough fibers. There was no evidence of molecular orientation along the axis of filaments produced from such a co-polymer.

Example 5

A co-polymer of 90 per cent vinylidene chloride and 10 per cent ethyl acrylate was prepared and drawn into fibers in a manner similar to that described in the preceding example. These fibers were tough, pliable, and showed molecular orientation along the fiber axis. Their softening point was about 170° C.

The examples herein have been drawn particularly to a description of filaments and fibers producible from polymers and co-polymers of vinylidene chloride, which in the case of co-polymers, contained insufficient co-polymerized material to make the co-polymer amorphous when examined by X-ray methods. I have also found that films and thin sheets may be prepared in analogous manner and that these will exhibit orientation of the molecules parallel to one another and to the surface of the film. In general, it may be said that the invention comprises a fabricated polymeric article capable of lying substantially in a single plane having at least one major dimension and at least one minor dimension less than 0.1 inch, comprising a material selected from the group consisting of polymeric vinylidene chloride and co-polymers thereof which contain less than 15 per cent of co-polymerizing materials and characterized by having orientation of the molecules parallel to one another and to a major surface of the article. There has been described a process whereby such materials may be prepared comprising heating above the softening point, chilling to supercool the product and drawing or extruding to provide oriented, tough, pliable articles. Similar results may be obtained in the case of films or thin sheets by heating a vinylidene chloride polymer or co-polymer above its softening point, cooling to below the softening point and preferably to a temperature in the range from room temperature to about 100° C., and rolling, extruding, or otherwise plastically deforming the mass into the desired shapes. Such treatment, especially if carried out while the polymer is in the "supercooled" state will result in the formation of an article wherein the molecules are oriented parallel to one another and to the major surface of the article.

I therefore particularly point out and distinctly claim as my invention:

1. A fabricated polymeric article capable of lying substantially in a single plane, having at least one major dimension, and at least one minor dimension less than about 0.1 inch, consisting essentially of a polymer of vinylidene chloride alone, said article being characterized by having orientation of the molecules parallel to one another and to a major surface of the article.

2. A filament consisting essentially of a polymer of vinylidene chloride alone, said filament being characterized by having molecular orientation parallel to its longitudinal axis.

3. A fabricated article having one dimension less than about 0.1 inch, consisting essentially of a material selected from the group consisting of polymeric vinylidene chloride and crystalline copolymers thereof, said article being characterized by having orientation of the crystals parallel to one another and to a major surface of the article.

4. A fabricated article having one dimension less than about 0.1 inch consisting essentially of a crystalline copolymer of vinylidene chloride, said article being characterized by having orientation of the crystals parallel to one another and to a major surface of the article.

RALPH M. WILEY.